United States Patent
Altschul

[11] Patent Number: 5,804,235
[45] Date of Patent: Sep. 8, 1998

[54] EDIBLE TOY FIGURES CONSTRUCTED OF BREAKFAST CEREAL

[76] Inventor: Randice-Lisa Altschul, 36 Cecilia Ave., Cliffside Park, N.J. 07010

[21] Appl. No.: 780,165

[22] Filed: Dec. 26, 1996

[51] Int. Cl.⁶ .................................................. A23L 1/164
[52] U.S. Cl. ........................... 426/104; 426/94; 426/103; 426/272; 426/285; 426/620; 426/621
[58] Field of Search ....................... 426/620, 621, 426/272, 285, 104, 93, 96, 94, 103

[56] References Cited

U.S. PATENT DOCUMENTS

| | | | |
|---|---|---|---|
| D. 356,431 | 3/1995 | Stein et al. . | |
| D. 356,432 | 3/1995 | Stein et al. . | |
| 901,455 | 10/1908 | Lauhoff | 426/96 |
| 2,160,730 | 2/1939 | Hackett . | |
| 2,181,109 | 11/1939 | Dodge | 426/93 |
| 2,339,418 | 1/1944 | McKay | 426/620 |
| 2,437,150 | 3/1948 | Berg | 426/285 |
| 2,858,218 | 10/1958 | Benson . | |
| 3,732,109 | 5/1973 | Poat et al. | 426/620 |
| 3,868,471 | 2/1975 | Decelles et al. | 426/93 |
| 3,903,308 | 9/1975 | Ode | 426/620 |
| 4,038,427 | 7/1977 | Martin | 426/285 |
| 4,178,392 | 12/1979 | Gobble et al. | 426/96 |
| 4,759,937 | 7/1988 | Spector . | |
| 4,834,988 | 5/1989 | Karwowski et al. | 426/621 |
| 4,849,233 | 7/1989 | Hemker | 426/93 |
| 4,853,235 | 8/1989 | Tomomatsu . | |
| 5,275,830 | 1/1994 | Smith | 426/620 |
| 5,413,805 | 5/1995 | Delpierre et al. | 426/620 |
| 5,447,584 | 9/1995 | Shakespeare et al. . | |

Primary Examiner—Steven Weinstein
Attorney, Agent, or Firm—Arthur Jacob

[57] ABSTRACT

An edible, full-dimensional toy figure constructed of prepared cereal for consumption with a liquid, such as milk and the like, includes a multiplicity of discrete, individual prepared cereal elemental members arranged in the form of the full-dimensional toy figure and bound together with a binding medium which retains the multiplicity of cereal elemental members self-sustaining in the form of the full-dimensional toy figure and is responsive to exposure to the liquid for relatively rapid dissolution and essentially immediate release of the retention of the self-sustaining arrangement into a mixture of the discrete individual prepared cereal elemental members in the liquid suitable for consumption, and a method for preparing the edible, full-dimensional toy figure.

5 Claims, 3 Drawing Sheets

EDIBLE TOY FIGURES CONSTRUCTED OF BREAKFAST CEREAL

EDIBLE TOY FIGURES CONSTRUCTED OF BREAKFAST CEREAL

The present invention relates generally to edible toy figures pertains, more specifically, to toy figures constructed of discrete, individual elemental members of prepared cereal bound together in a self-sustaining full-dimensional toy figure by a binding responsive to exposure to a liquid, such as milk, to defeat the binding and rapidly release the individual elemental members for consumption in a mixture of loose individual elemental members of prepared cereal in the liquid.

Prepared breakfast cereals have become a staple item in households throughout the world and are being offered for sale and consumption in more and more varied forms. Many of these forms have been developed not only for providing desirable taste and flavor, but for aesthetic appeal as well. Since children comprise a very large audience for breakfast cereals, many of the parameters employed in the preparation and presentation of cereal products are directed toward appealing to children.

The present invention presents contemporary breakfast cereal products in a form which stimulates a child's imagination and encourages the child to consume the cereal. As such, the present invention attains several objects and advantages, some of which are summarized as follows: Utilizes currently available breakfast cereal products presented in a form which appeals to a child's imagination for encouraging desirable consumption of the cereal; provides individual portions of prepared cereal in an appealing form; enables ready packaging and attractive display of prepared cereal at a point of purchase; allows imaginative packaging of measured portions of prepared cereals for display and sale; stimulates a child's imagination for encouraging nutrition through play scenarios; enables the development of wider markets for conventional, currently available prepared breakfast cereal products.

The above objects and advantages, as well as further objects and advantages, are attained by the present invention which may be described briefly as a edible, full-dimensional toy figure constructed of prepared cereal for consumption with a liquid, such as milk and the like, the toy figure comprising: a multiplicity of discrete, individual prepared cereal elemental members arranged in the form of the full-dimensional toy figure; and a binding medium retaining the multiplicity of cereal elemental members self-sustaining in the form of the full-dimensional toy figure, the binding medium being responsive to exposure to the liquid for relatively rapid dissolution and essentially immediate release of the retention of the self-sustaining arrangement into a mixture of the discrete individual prepared cereal elemental members in the liquid, for consumption. The invention includes a method for making an edible, full-dimensional toy figure constructed of prepared cereal for consumption with a liquid, such as milk and the like, the method comprising: moistening a multiplicity of discrete, individual prepared cereal elemental members while maintaining the integrity of the elemental members; arranging the multiplicity of moistened discrete, individual prepared cereal elemental members into a configuration corresponding to the full-dimensional toy figure; and drying the arranged multiplicity of discrete, individual prepared cereal elemental members to establish a self-sustaining form corresponding to the full-dimensional toy figure.

BRIEF DESCRIPTION OF THE SEVERAL VIEWS OF THE DRAWING

The invention will be understood more fully, while still further objects and advantages will become apparent, in the following detailed description of preferred embodiments of the invention illustrated in the accompanying drawing, in which.

Figure 1:
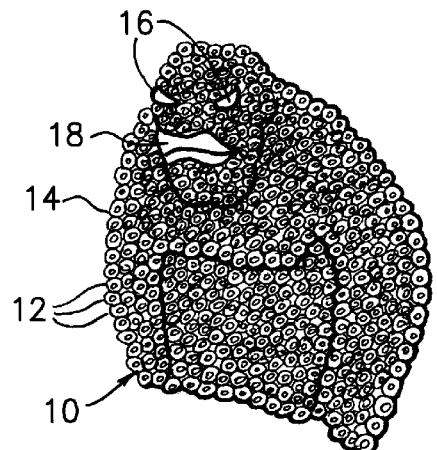
FIG. 1 is a pictorial illustration of a toy figure constructed in accordance with the present invention.

Referring now to the drawing, and especially to FIG. 1 thereof, a toy figure constructed in accordance with the present invention is illustrated at 10 and is seen to be constructed of a multiplicity of discrete, individual elemental members 12 of prepared cereal. In the illustrated embodiment, the prepared cereal elemental members 12 are in the form of O-shaped members, such as those currently available under the trademark CHEERIOS. The multiplicity of elemental members 12 are arranged so as to provide toy FIG. 10 with a full-dimensional configuration, here made to resemble an arbitrary monster shape 14. Decorative elements have been added, in the form-of eyes 16 and lips 18, to complete the monster representation of the full-dimensional toy FIG. 10.

Figure 2:
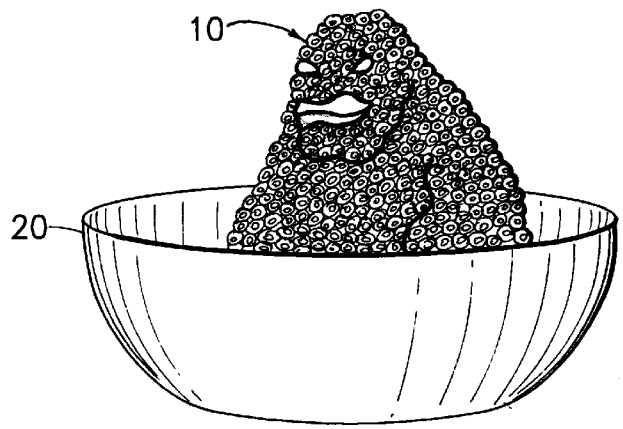
FIG. 2 is a pictorial illustration of the toy figure in a first stage of use.
Figure 3:
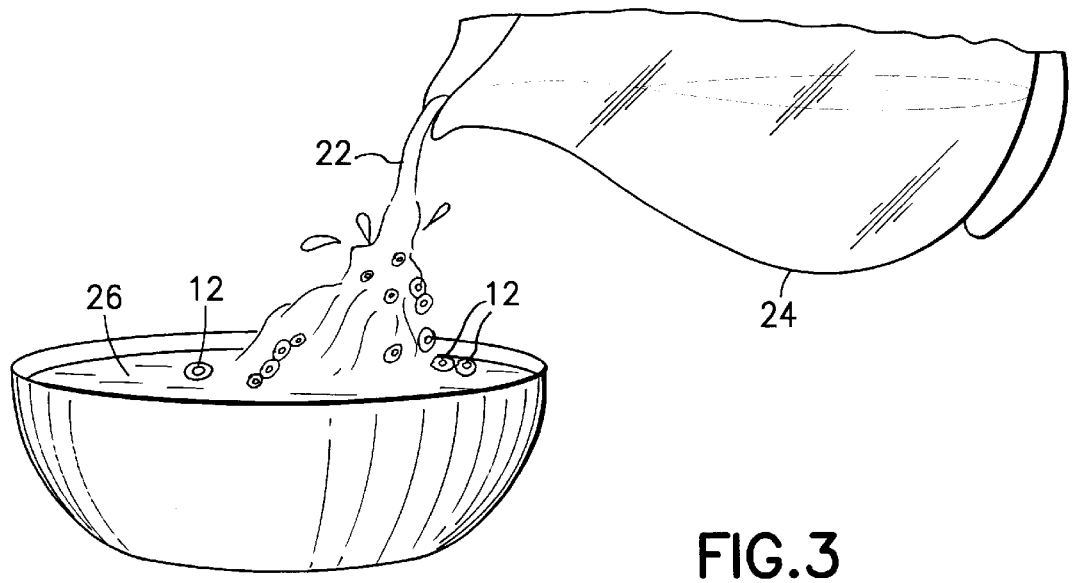
FIG. 3 is a pictorial illustration of the toy figure in a second stage of use.
Figure 4:
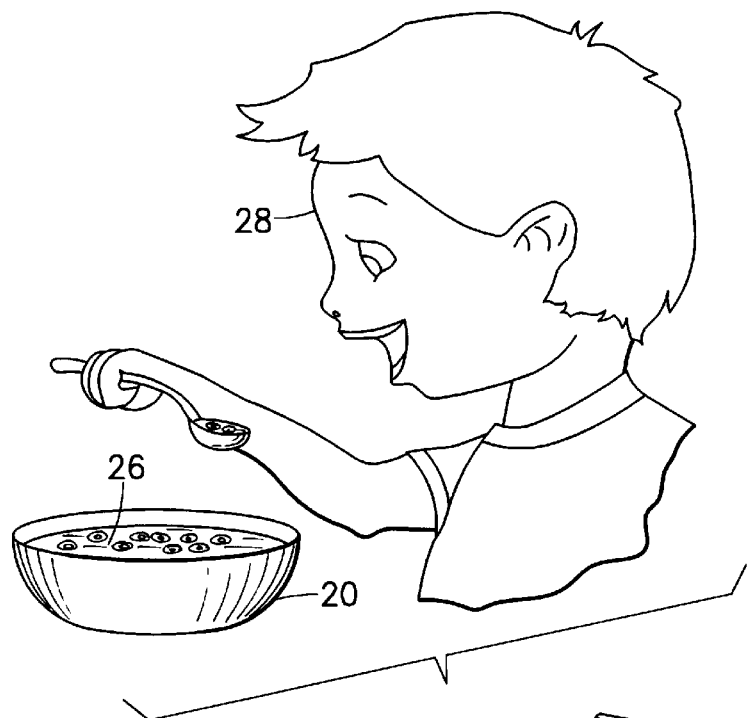
FIG. 4 is a pictorial illustration showing a third stage.

Turning to FIGS. 2 through 4, toy FIG. 10 is placed in a cereal bowl 20 and a liquid in the form of milk 22 is poured over the toy FIG. 10, as from a pitcher 24. Immediately upon being exposed to the milk 22, the discrete, individual elemental members 12 are dissociated from one another and the toy FIG. 10 appears to dissolve into a mixture 26 of individual elemental members 12 in milk 22, ready for consumption by a child 28 in the conventional manner of eating breakfast cereals. The decorative elements, such as eyes 16 and lips 18, are comprised of an edible material, preferably a sugar-based soluble material, and merely merge with the mixture 26. In the imagination of the child 28, the monster has been destroyed and the world saved by consumption of the mixture 26.

Figure 5:
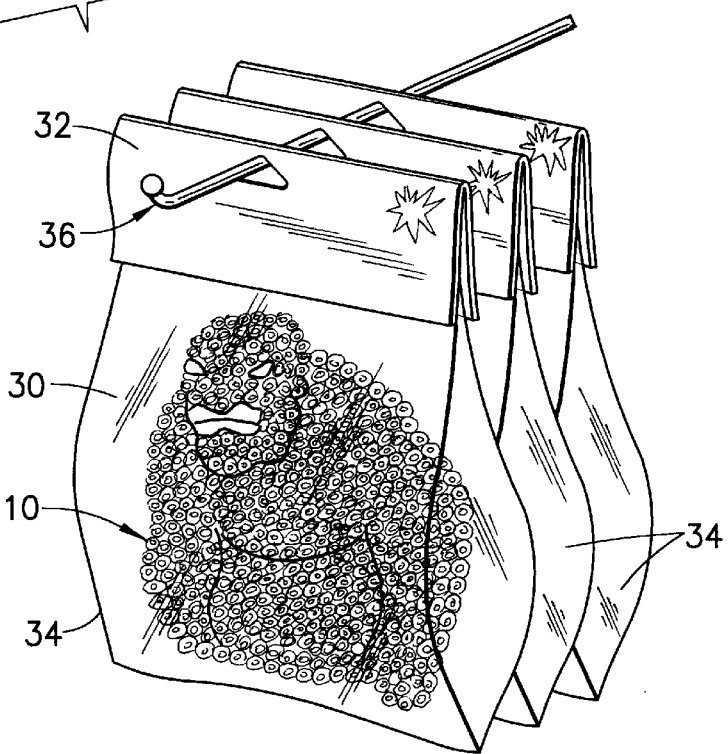
FIG. 5 is a pictorial illustration of the toy figure packaged for display at a point of purchase.

In FIG. 5, the toy FIG. 10 is seen packaged in a transparent envelope 30 with a header 32 enabling completed packages 34 to be displayed at a point of purchase, utilizing a conventional pegboard display 36. The size of the toy FIG. 10 is chosen to provide a volume of elemental members 12 constituting a selected measured individual portion of breakfast cereal, in this instance CHEERIOS, so that each package 34 advantageously provides an individual serving of breakfast cereal. In this manner, an individual serving is made readily available, and the child 28 is encouraged to consume a full measured portion.

Referring now to FIGS. 6 through 9, as well as to FIG. 1, toy FIG. 10 is made by binding together the multiplicity of elemental members 12 in the form of the desired configuration. Most currently available prepared cereal products have some sugar content which establishes some surface sugar so that upon moistening the elemental members 12 of such prepared cereal products, the elemental members 12 can be adhered to one another in a full-dimensional configuration by utilizing the sugar available in-the prepared cereal product. The tenacity of the adherence among the elemental members 12 is such that the integrity of the toy FIG. 10 is maintained during shipping, storage and ordinary handling, and will allow rapid, essentially immediate separation of the elemental members 12 when exposed to milk 22 or a like liquid, as described above. Should sufficient surface sugar not be available in the prepared cereal product itself, sugar may be added to attain the desired adherence. Thus, for example, commercially available cereal products such as those sold under the trademarks FRUIT LOOPS and APPLE JACKS have sufficient surface sugar to enable elemental members of such cereal products to be adhered together adequately by moistening the elemental members with water so that the surface sugar of the cereal product itself serves as a binding medium. Other commercially available cereal products, such as those sold under the trademarks CHEERIOS, ALPHA BITS, COCOA PUFFS and WHEAT PUFFS, do not have surface sugar sufficient to bind the elemental members of such cereal products together in the desired manner and must be moistened with a solution of sugar in water. It has been found that for control in the production of consistently viable toy FIGS. 10, a solution of sugar in water containing up to about fifty percent by weight of sugar is sufficient to bind together the elemental members of essentially all of the most commonly available cereal products into a self-sustaining full-dimensional figure and will enable dissociation of the elemental members fully and quickly upon exposure of the self-sustaining figure to milk or the like. Solutions containing sugar in excess of that amount tends to become more syrup-like in nature and will delay dissociation of the elemental members 12 from one another. Solutions containing lesser amounts of sugar are adequate for those cereal products having greater amounts of available surface sugar, but will provide inadequate binding of the elemental members of those cereal products having less available surface sugar.

Figure 6:
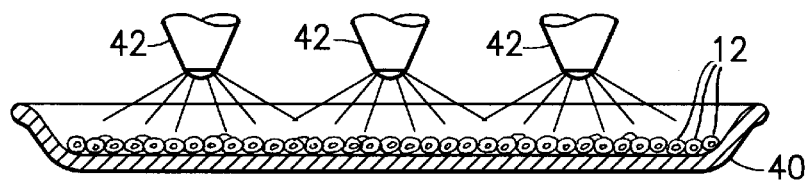
FIGS. 6 through 9 are largely diagrammatic illustrations showing a method of the present invention.
Figure 7:
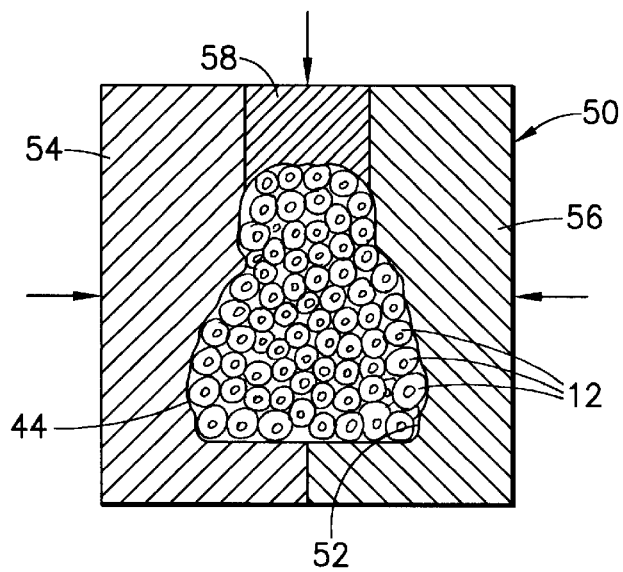
Figure 8:
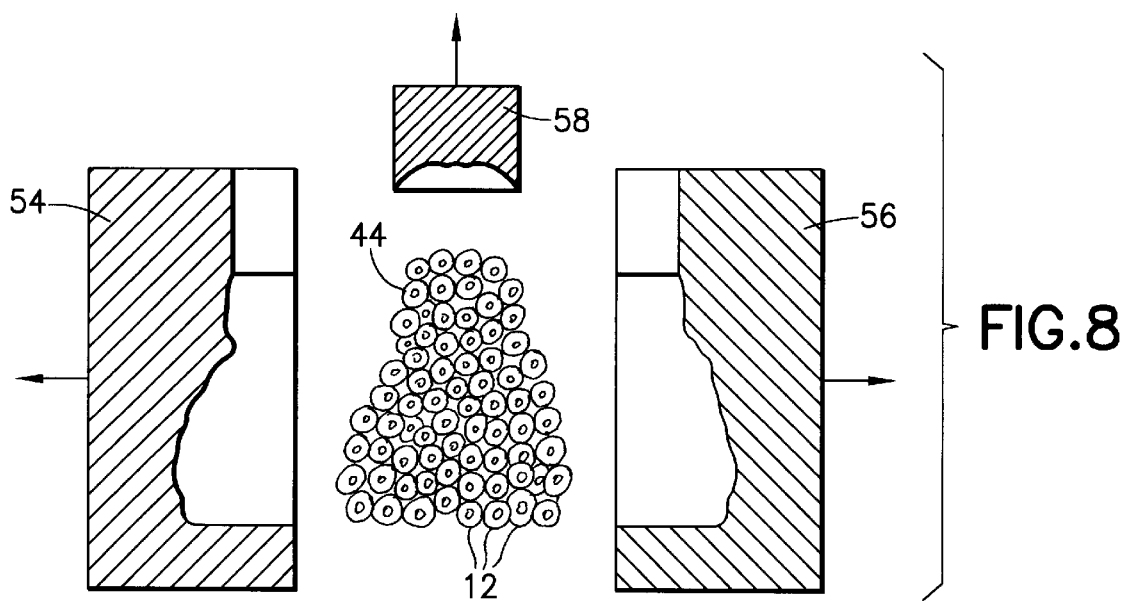
Figure 9:
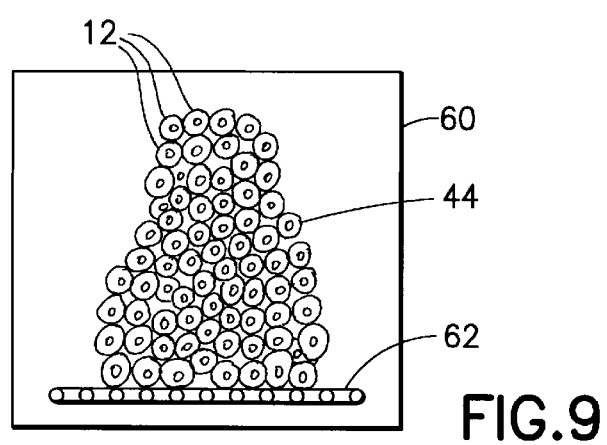

As best seen in FIG. 6, elemental members 12 of a prepared cereal product are spread upon a conventional baking tray 40. The elemental members 12 then are moistened, preferably with a solution of sugar in water, the amount of sugar depending upon the surface sugar already available in the elemental members 12, as set forth above, by spraying moisture from spray heads 42 onto the elemental members 12. The amount of moisture is sufficient to assure that dissolved sugar becomes available at the surfaces of the elemental members 12 for binding purposes, but not so great as to render the elemental members 12 spongy or soggy. A multiplicity of moistened elemental members 12 then are arranged into a configuration corresponding to the desired shape of the fully-dimensional toy FIG. 10, preferably by placing a charge 44 of the moistened elemental members 12 in a mold 50, as shown in FIG. 7. Mold 50 includes a cavity 52 between separable mold parts 54 and 56, and a pressure plate 58. The charge 44 then is compressed by movement of the pressure plate 58 toward the cavity 52, establishing only a light pressure sufficient to press the elemental members 12 together, without crushing or otherwise damaging the integrity of the individual elemental members 12. The molded charge 44 then is removed from the cavity 52 by parting the mold parts 54 and 56, as seen in FIG. 8, and the formed charge 44 then is dried in a drying oven 60, placed upon a drying rack 62 as shown in FIG. 9, at a temperature low enough to preclude browning of the cereal product. Air drying at about 120° F. for about two hours is sufficient to drive off the moisture and produce a self-sustaining full-dimensional toy FIG. 10 of sufficient integrity to withstand handling while enabling rapid, essentially immediate dissolution upon exposure to milk, as set forth above.

While in the illustrated embodiments the toy FIG. 10 is shown in the form of a monster representation, it will be understood that a limitless variety of configurations is available for toy FIG. 10, including, but not limited to, animals, vehicles and other objects, geometric shapes, humanoid figures and various licensed character figures.

It will be seen that the present invention attains the several objects and advantages summarized above, namely: Utilizes currently available breakfast cereal products presented in a form which appeals to a child's imagination for encouraging desirable consumption of the cereal; provides individual portions of prepared cereal in an appealing form; enables ready packaging and attractive display of prepared cereal at a point of purchase; allows imaginative packaging of measured portions of prepared cereals for display and sale; stimulates a child's imagination for encouraging nutrition through play scenarios; enables the development of wider markets for conventional, currently available prepared breakfast cereal products.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. An edible, full-dimensional toy figure constructed of pre-formed, ready-to-eat breakfast cereal for consumption with an edible liquid, the toy figure comprising:
   a multiplicity of discrete, individual pre-formed, ready-to-eat pieces of breakfast cereal bound together to form the full-dimensional toy figure dimensioned to be placed within a breakfast cereal bowl; and
   a binding medium binding the multiplicity of pieces of breakfast cereal together in the form of the full-dimensional toy figure, the binding medium having a limited tenacity such that the integrity of the shape of the toy figure is maintained during shipping and storage, but will allow rapid, essentially immediate separation of the pieces of breakfast cereal from each other when exposed to said edible liquid in said breakfast cereal bowl to convert said toy figure into a mixture of pre-formed, ready-to-eat pieces of breakfast cereal in the liquid in the breakfast cereal bowl, for consumption.

2. The invention of claim 1 wherein the binding medium comprises sugar in an amount sufficient to bind the multiplicity of discrete individual pre-formed ready-to-eat pieces of breakfast cereal together in the form of the full-dimensional toy figure and to essentially immediately release the individual pieces of breakfast cereal to the mixture upon exposure to said edible liquid.

3. The invention of claim 1 wherein the multiplicity of discrete individual nieces of breakfast cereal comprises a single serving portion of the pieces of breakfast cereal.

4. An individual portion of pre-formed, ready-to-eat breakfast cereal for consumption with an edible liquid, the individual portion comprising:
   a multiplicity of discrete, individual pre-formed, ready-to-eat pieces of breakfast cereal bound together to form a full-dimensional object which is dimensioned to be placed within a breakfast cereal bowl; and
   a binding medium binding the multiplicity of pieces of breakfast cereal together in the form of the full-dimensional object, the binding medium having a limited tenacity such that the integrity of the shape of the full-dimensional object is maintained during shipping and storage, but will allow rapid, essentially immediate separation of the pieces of breakfast cereal from each other when exposed to said edible liquid in said breakfast cereal bowl to convert said full-dimensional object into a mixture of pre-formed, ready-to-eat pieces of breakfast cereal in the liquid in the breakfast cereal bowl, for consumption.

5. The invention of claim 4 wherein the binding medium comprises sugar in an amount sufficient to bind the multiplicity of discrete individual pre-formed, ready-to-eat pieces of breakfast cereal together in the form of the full-dimensional object and to essentially immediately release the individual pieces of breakfast cereal to the mixture upon exposure to said edible liquid.

* * * * *